United States Patent
Nagao et al.

(10) Patent No.: US 11,762,604 B2
(45) Date of Patent: *Sep. 19, 2023

(54) APPLICATION PROGRAM

(71) Applicant: BROTHER KOGYO KABUSHIKI KAISHA, Nagoya (JP)

(72) Inventors: Satoki Nagao, Ichinomiya (JP); Ryoji Ban, Ama (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/709,478

(22) Filed: Mar. 31, 2022

(65) Prior Publication Data

US 2022/0317942 A1 Oct. 6, 2022

(30) Foreign Application Priority Data

Mar. 31, 2021 (JP) .................................. 2021-059361
Mar. 31, 2021 (JP) .................................. 2021-059364

(51) Int. Cl.
  *G06F 3/12* (2006.01)
  *H04W 4/80* (2018.01)

(52) U.S. Cl.
  CPC .......... *G06F 3/1204* (2013.01); *G06F 3/1238* (2013.01); *G06F 3/1292* (2013.01); *H04W 4/80* (2018.02)

(58) Field of Classification Search
  None
  See application file for complete search history.

(56) References Cited

U.S. PATENT DOCUMENTS

| | | | |
|---|---|---|---|
| 2007/0225962 A1* | 9/2007 | Brunet | G06F 11/1461 703/23 |
| 2014/0038517 A1 | 2/2014 | Asakura | |
| 2016/0127581 A1* | 5/2016 | Suzuki | H04W 4/80 358/1.15 |
| 2021/0274577 A1* | 9/2021 | Kawai | G06F 3/126 |

FOREIGN PATENT DOCUMENTS

JP  2016-181934 A  10/2016

* cited by examiner

*Primary Examiner* — Frantz Bataille
(74) *Attorney, Agent, or Firm* — Kenealy Vaidya LLP

(57) ABSTRACT

A non-transitory computer readable medium stores an application program causing an information processing apparatus to execute a process for printing, an operating system of the information processing apparatus has an automatic function which automatically executes a series of procedures and operations in response to satisfaction of an activation condition, the application program is activated based on a user operation, or activated by the automatic function of the operating system, the information processing apparatus includes a first communication interface. The process includes receiving a selection of data to be printed, acquiring input information in a case where the application program is activated by the automatic function of the operating system, and establishing the first wireless communication with a specific printer using the connection information and outputting the print job to the specific printer using the first wireless communication.

20 Claims, 7 Drawing Sheets

APPLICATION PROGRAM

CROSS-REFERENCE TO RELATED APPLICATIONS

This application is based on and claims priority under 35 USC 119 from Japanese Patent Application No. 2021-059361 filed on Mar. 31, 2021 and Japanese Patent Application No. 2021-059364 filed on Mar. 31, 2021, the contents of which are incorporated herein by reference.

BACKGROUND

The technical field disclosed in the present description relates to an application program that outputs a print job to a printer.

A technique for activating an application program when a predetermined activation condition is satisfied is known. For example, a related art discloses a configuration in which a multi function device having a near field communication function activates an application program of an external device according to a state of the external device when near field communication between the multi function device and the external device is established.

An operating system (OS) is equipped with an automatic function in which procedure data indicating a series of procedures for a plurality of functions and operations is registered in the OS, and the OS automatically executes the functions and operations according to the registered procedure data. By using the automatic function, a work of a user until a desired output is obtained is automated, and thus an operational burden on the user is significantly reduced. However, after activating an application program, for example, assuming that the application program outputs the print job, it is necessary to perform operations of selecting a print target and inputting a print instruction. Even in the configuration disclosed in the related art, it is necessary to establish the near field communication again after the user performs an operation for printing on the application program of the external device. Therefore, there is room for further reducing the operational burden on the user.

The present description discloses a technique for reducing the time and effort for an operation of a user when printing an image by a printer in an information processing apparatus in which an operating system is equipped with an automatic function.

SUMMARY

According to an aspect of the present disclosure, a non-transitory computer readable medium stores an application program causing an information processing apparatus to execute a process for printing, an operating system of the information processing apparatus has an automatic function which automatically executes a series of procedures for a plurality of functions and operations in response to satisfaction of an activation condition in a case where procedure data indicating the series of procedures and the activation condition is registered in the operating system, the application program is configured to be activated based on a user operation using a user interface of the information processing apparatus, or activated by the automatic function of the operating system, the information processing apparatus includes a first communication interface configured to perform a first wireless communication conforming to a given standard.

The process includes receiving a selection of data to be printed using the user interface and outputting a print job based on the selected data to be printed in a case where the application program is activated based on the user operation using the user interface of the information processing apparatus, acquiring input information in a case where the application program is activated by the automatic function of the operating system, the input information being sent from the operating system at the time of the activation of the application program and including connection information used for establishing the first wireless communication, the operating system sending the input information including the connection information to the application program at the time that the application program is activated by the automatic function, and establishing the first wireless communication with a specific printer using the connection information included in the input information acquired in the acquiring, and outputting the print job to the specific printer using the first wireless communication in the case where the application program is activated by the automatic function of the operating system.

According to another aspect of the present disclosure, a non-transitory computer readable medium stores an application program causing an information processing apparatus to execute a process for printing, an operating system of the information processing apparatus has an automatic function which automatically executes a series of procedures for a plurality of functions and operations in response to satisfaction of an activation condition in a case where procedure data indicating the series of procedures and the activation condition is registered in the operating system, the information processing apparatus includes a first communication interface configured to perform a first wireless communication conforming to a given standard, and the application program is configured to be activated based on a user operation using a user interface of the information processing apparatus, or activated by the automatic function of the operating system.

The process includes receiving a selection of data to be printed using the user interface and outputting a print job based on the selected data to be printed in a case where the application program is activated based on the user operation using the user interface of the information processing apparatus, and establishing the first wireless communication with a printer provided with a communication interface configured to perform the first wireless communication, determining data to be printed, and outputting a print job that prints the data to be printed determined in the determining to the printer with which the first wireless communication is established in the establishing, in a case where the application program is activated by the automatic function of the operating system.

DESCRIPTION OF EMBODIMENTS

Hereinafter, an embodiment in which a program installed in an electronic device is embodied will be described in detail with reference to the accompanying drawings. The present embodiment discloses an application program (hereinafter, referred to as an "application") installed in a portable electronic device including a smartphone or a tablet computer.

Figure 1:
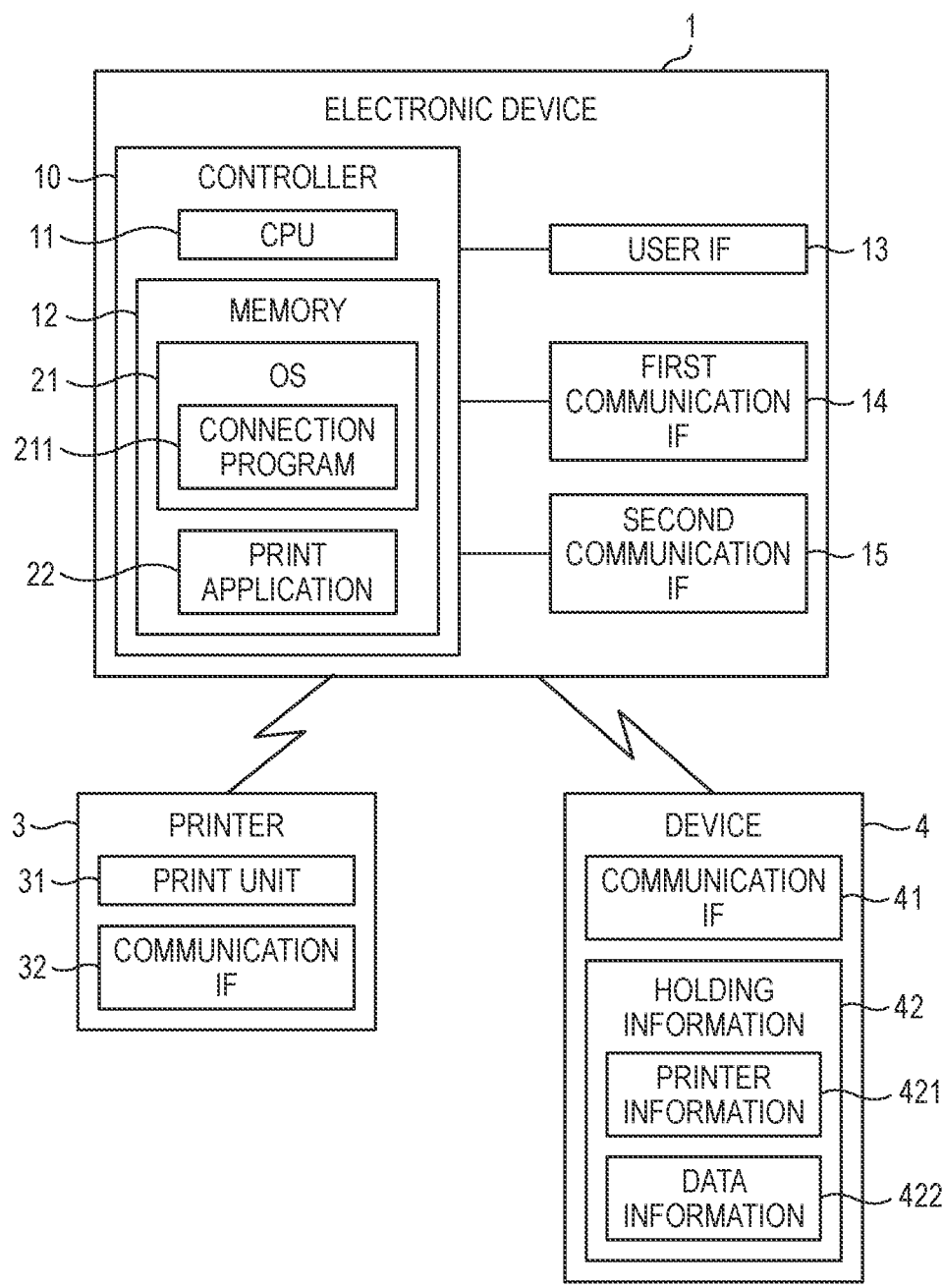
FIG. 1 is a schematic configuration diagram of an electronic device according to an embodiment.

As shown in FIG. 1, an electronic device t in the present embodiment includes a controller 10 including a CPU 11 and a memory 12. The electronic device 1 further includes a user interface (hereinafter, referred to as a "user IF") 13, a first communication interface (hereinafter, referred to as a "first communication IF") 14, and a second communication interface (hereinafter, referred to as a "second communication IF") 15, which are electrically connected to the controller 10. The electronic device 1 is an example of an information processing apparatus. The controller 10 in FIG. 1 is a generic concept of hardware and software used for controlling the electronic device 1, and does not always need to exist in the electronic device 1 as a single piece of hardware.

The CPU 11 executes various processes in accordance with a program read from the memory 12 or based on a user operation. The memory 12 includes, for example, a ROM, a RAM, an HDD, and a flash memory, and stores various programs and data.

The user IF 13 may include a display function and a configuration having an operation reception function. The user IF 13 may include a touch panel having a display function and a touch reception function. The user IF 13 may also include a microphone having a voice input function or a speaker having a voice output function.

Both the first communication IF 14 and the second communication IF 15 include hardware for performing wireless communication with various external devices. The first communication IF 14 includes hardware for performing wireless communication using a first communication method, and the second communication IF 15 includes hardware for performing wireless communication using a second communication method which is different from the first communication method.

The first communication method has a larger communication range, which is a communicable distance, and a larger data size of communicable communication data than those of the second communication method. A communication method of the first communication IF 14 is, for example, a communication method based on Wi-Fi, Bluetooth, or a bluetooth low energy (BLE) standard. A communication method of the second communication IF 15 is, for example, a communication method conforming to a near field communication (NFC) standard, Bluetooth, or the BLE standard. The electronic device 1 may further include a communication IF using another communication method. Wi-Fi is a registered trademark of Wi-Fi Alliance. Bluetooth is a registered trademark of Bluetooth SIG, Inc.

The electronic device 1 may further include a camera having an imaging function and various detection units that detect various states of the electronic device 1.

As shown in FIG. 1, an operating system (hereinafter, referred to as an "OS") 21 and various applications are installed in the memory 12 of the electronic device 1 in the present embodiment. The OS 21 is a multitask OS configured to process a plurality of tasks in parallel by managing and switching the plurality of tasks, and is, for example, any one of iOS, Android, Windows, macOS, or Linux. iOS and macOS are registered trademarks of Apple Inc. Android is a registered trademark of Google LLC. Windows is a registered trademark of Microsoft Corporation. Linux is a registered trademark of Linus Torvalds.

A connection program 211 is installed in the OS 21 of the electronic device 1 in the present embodiment. The connection program 211 is a program that automatically executes, based on procedure data registered in advance, a process registered in the procedure data. The connection program 211 is an example of a program for realizing an automatic function. The connection program 211 is, for example, Siri Shortcuts that is operational on iOS. Sin Shortcuts is a registered trademark of Apple Inc.

In the connection program 211, one or more pieces of procedure data may be registered, and a trigger condition that is a condition for starting execution of a procedure and an action that is a content of the procedure to be executed are stored in association with each other in each procedure data. The connection program 211 constantly detects triggers of the registered procedure data, and when it is detected that a trigger condition is satisfied, execution of the action corresponding to the rigger is started. In the actions of the procedure data, a series of procedures for sequentially executing a plurality of functions and operations in a predetermined order may be registered. The trigger condition is an example of an activation condition of the automatic function, and the action is an example of a procedure of the automatic function.

In the procedure data of the connection program 211, for example, reception of a predetermined operation to the user IF 13, detection of predetermined information by various detection units of the electronic device 1, and output of predetermined information by various applications installed in the electronic device 1 may be registered as the triggers. In addition, in the procedure data of the connection program 211, for example, output to the user IF 13, reception of operation input, activation or stop of a predetermined application, and output of predetermined information to a predetermined application may be registered as the actions.

The electronic device 1 in the present embodiment has a lock function of selecting a locked state or an unlocked state as a display mode of the user IF 13. For example, the electronic device 1 is set in a locked state when receiving no operation for a predetermined time or longer. In the locked state, the electronic device 1 displays, for example, a screen for a predetermined locked state and restricts a part of an operation to the user IF 13.

The electronic device 1 releases the locked state and is brought into the unlocked state when the electronic device 1 receives input of release information for releasing the locked state in the locked state and the received release information matches the release information stored in the memory 12. After moved to the unlocked state, the electronic device 1 stops displaying the screen for the locked state, and displays a screen for the unlocked state in which a screen can receive various operations.

However even in the locked state, the OS 21 or the connection program 211 performs detection by each detection unit or determines whether an operation corresponds to the trigger in the registered procedure data. When it is determined that the trigger condition in the registered procedure data is satisfied, the connection program 211 automatically starts execution of the action corresponding to the trigger even in the locked state.

Various applications may be installed in the electronic device 1, and various applications including at least a print application 22 are installed in the electronic device 1 in the present embodiment. The print application 22 is a program having a function of generating a print job for causing a printer to execute printing and transmitting the generated print job to a designated transmission destination. The transmission destination of the print job may be a printer directly connected to the electronic device 1, or may be a server shared with a printer not directly connected to the electronic device 1. The print application 22 is an example of the application program. Details of an operation by the print application 22 will be described later.

The print application 22 may be a dedicated program corresponding to a printer of a predetermined model, or may be a general-purpose program corresponding to various printers. The print application 22 may be a program for a printer that performs printing on a sheet of a standard size including A4, a program for a printer that performs printing on a label sheet to create a label, or a program that is compatible for both.

The printer 3 in the present embodiment includes a print unit 31 including a print head, and a communication IF 32 of a predetermined standard, and is a device configured to receive a print job and perform printing based on the print job. The printer 3 performs the wireless communication with the electronic device 1 using the first communication method via the communication IF 32 and the first communication IF 14 of the electronic device 1. The wireless communication between the communication IF 32 of the printer 3 and the first communication IF 14 of the electronic device 1 is an example of a first wireless communication. The printer 3 is an example of a specific printer.

The printer 3 in the present embodiment is, for example, a so-called label printer that accommodates a roll-shaped label sheet and performs printing on the label sheet and conveyance of the label sheet to create a label. The printer 3 in the present embodiment is configured to detect a label width of the accommodated label sheet, and return information indicating the label width of the accommodated label sheet in response to an inquiry from the electronic device 1 or the like. The label width is a size of the label sheet in a direction orthogonal to a conveyance direction of the printer 3. The printer 3 may be a device that performs printing on plain paper or the like by an electrophotographic method or an inkjet method.

The device 4 in the present embodiment includes a communication IF 41 and holding information 42, and is a device having a function of near field communication. The device 4 performs the wireless communication which is the near field communication with the electronic device 1 by the second communication method via the communication IF 41 and the second communication IF 15 of the electronic device 1. The wireless communication between the communication IF 41 of the device 4 and the second communication IF 15 of the electronic device 1 is an example of a second wireless communication. The device 4 is an example of a specific device. The device 4 may be a part of the printer 3.

For example, the device 4 may periodically transmit a detection signal and receive a response, and when a response is received, the device 4 establishes the near field communication with a device that transmits the response. In addition, the electronic device 1 in the present embodiment has a function of establishing the near field communication with the device 4 via the second communication IF 15. That is, when the electronic device 1 is located within a predetermined distance range from the device 4 and receives the detection signal transmitted from the device 4, the electronic device 1 transmits a response signal to the device 4.

After establishing the near field communication with the electronic device 1, the device 4 transmit the holding information 42 in response to a request from the electronic device 1. The holding information 42 includes printer information 421 used for connection with the printer 3. The printer information 421 includes, for example, information for specifying the printer 3 and connection information for connecting to the printer 3. The connection information includes, for example, authentication information for establishing the wireless communication via the communication IF 32 of the printer 3.

The holding information 42 of the device 4 may further include data information 422 indicating data to be printed. The data information 422 is, for example, information of a character string to be included in an image to be printed and information designating a template to be used. The holding information 42 included in the device 4 is stored in the device 4 in advance by a user of the device 4.

Next, an example of the operation by the print application 22 will be described with reference to a sequence diagram and the like. The following processes and process steps basically indicate the processes by the CPU 11 according to commands described in each program. The processes by the CPU 11 also include hardware control using an API of the OS 21 of the electronic device 1. In the present description, an operation of the program will be described while omitting description of the OS 21.

Figure 2:
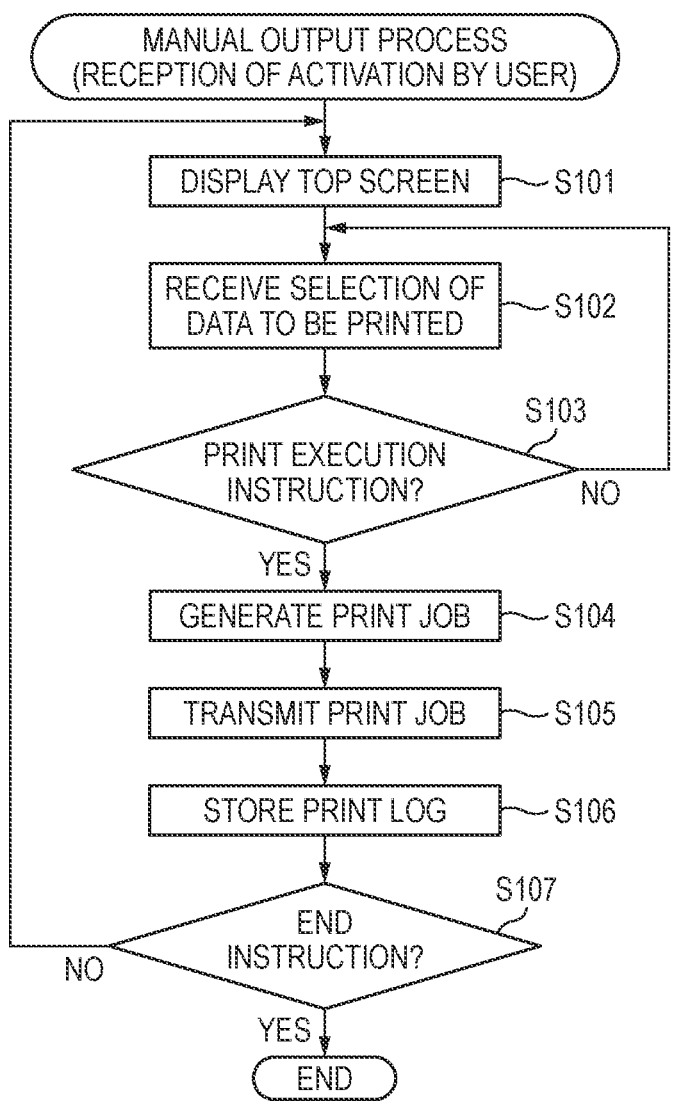
FIG. 2 is a flowchart showing procedures of a manual output process.

First, procedures of a manual output process, which is a process of the print application 22 manually activated based on a user operation, will be described with reference to a flowchart of FIG. 2. The manual output process is executed by the CPU 11 of the electronic device 1 based on the print application 22 when the print application 22 is designated and activated based on the user operation to the user IF 13, for example, based on an operation on an icon of the application by the user.

In the manual output process, the CPU 11 displays an initial input screen (S101), and receives the user operation. The CPU 11 receives a selection of the data to be printed and a print parameter based on the user operation (S102). When a printer is not selected, the CPU 11 also receives a selection of the printer. Then, the CPU 11 determines whether an instruction to execute printing is received (S103), and when the instruction is not received (S103: NO), the CPU 11 further receives a user operation.

When it is determined that the instruction to execute printing is received (S103: YES), the CPU 11 generates a print job (S104), and transmits the generated print job to a designated transmission destination (S105). The transmission destination of the print job may be the printer 3 connected to the electronic device 1, or may be a server shared with a printer not connected to the electronic device 1.

After transmitting the print job, the print application 22 in the present embodiment stores a print log (S106). In the print log, information indicating the data to be printed, information indicating the printer as a device for printing, and information indicating a date and time when printing is executed are stored in association with each other. The print log may include information indicating the print parameter. In addition, the information indicating the data to be printed may include information indicating a color of a coloring material to be used for printing the data.

Further, the CPU It determines whether an instruction to end the print application 22 by a user operation is received (S107). When the end instruction is not received (S107: NO), for example, the process returns to the display of the initial input screen or the like, and the CPU 11 further receives a user operation. When it is determined that the end instruction is received by the user operation (S107: YES), the CPU 11 ends the print application 22.

The print application 22 in the present embodiment may be activated in a procedure different from the user operation. In the electronic device 1 in the present embodiment, the one or more pieces of procedure data in which an activation procedure of the print application 22 is included in the actions are registered. The print application 22 is automatically activated by the connection program 211 when the trigger condition in the registered procedure data is satisfied. The actions of the procedure data in which the activation procedure of the print application 22 is included in the actions include a procedure of sending input information including activation information, which is information of the trigger condition in the procedure data, to the activated print application 22.

The registration of the procedure data is performed, for example, automatically or based on a user selection with installation of the print application 22 by using a registration file provided together with the print application 22. In addition, a registration application for registering the procedure data may be provided as an application different from the print application 22. In this case, the registration application is executed based on the selection of the user, and thus the selected procedure data is registered in the electronic device 1.

When the print application 22 is activated based on the procedure data by the function of the connection program 211, the print application 22 receives input information to be input from the connection program 211, and determines a process procedure after the activation based on the received input information. For example, a determination procedure determining the data to be printed is different for each piece of activation information included in the input information.

The print application 22 in the present embodiment does not receive the input information when being manually activated based on a normal operation of the user without using the connection program 211. The print application 22 executes the manual output process described above when not receiving the input information at the time of activation. The print application 22 in the present embodiment executes different operations in a case of being manually activated based on the user operation, that is, in a case of not receiving the input information at the time of activation, and in a case of being automatically activated by the connection program 211, that is, in a case of receiving the input information at the time of activation.

Next, an example of an operation of the print application 22 when being automatically activated by the connection program 211 based on the procedure data registered in the electronic device 1 will be described.

It is assumed that procedure data (hereinafter, referred to as "approach procedure data") including a determination of the establishment of the near field communication by the second communication IF 15 as a trigger condition is registered in the electronic device 1 in the present embodiment. The approach procedure data is an example of specific procedure data. The trigger condition in the approach procedure data in the present embodiment is the establishment of the near field communication, and an action indicated in the approach procedure data includes activation of the print application 22 and a procedure of sending information acquired by the near field communication to the print application 22 as input information. The near field communication is, for example, communication with NFC or BLE, and is established by the OS 21 when the electronic device 1 approaches a device including the device 4 compatible with the near field communication as described above. Specifically, the trigger condition in the approach procedure data is that the electronic device 1 is approached to a device waiting for the near field communication by the user.

Figure 3A:
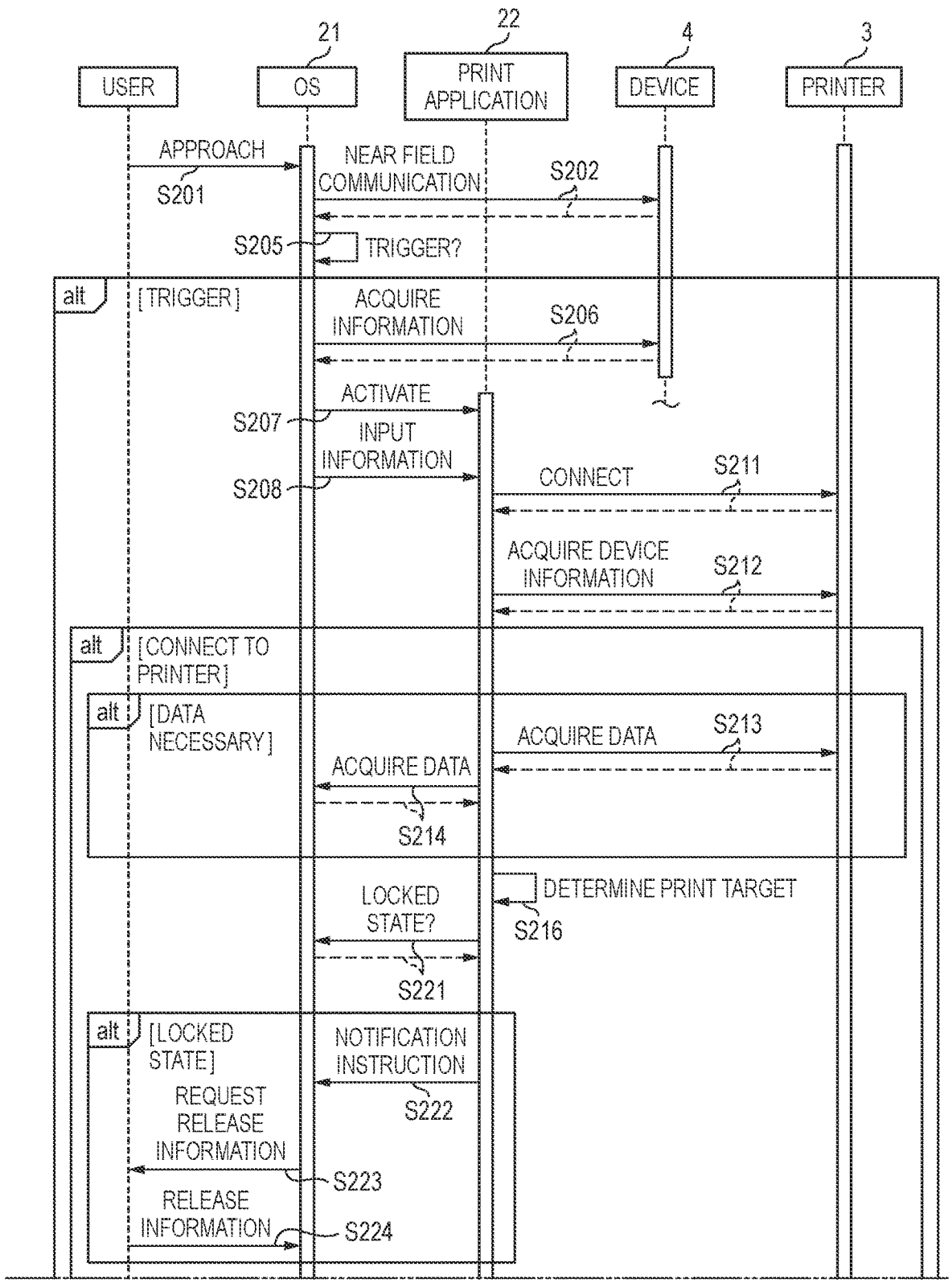
FIGS. 3A and 3B show a sequence diagram showing procedures of processes executed by a print application when being activated by establishment of near field communication.
Figure 3B:
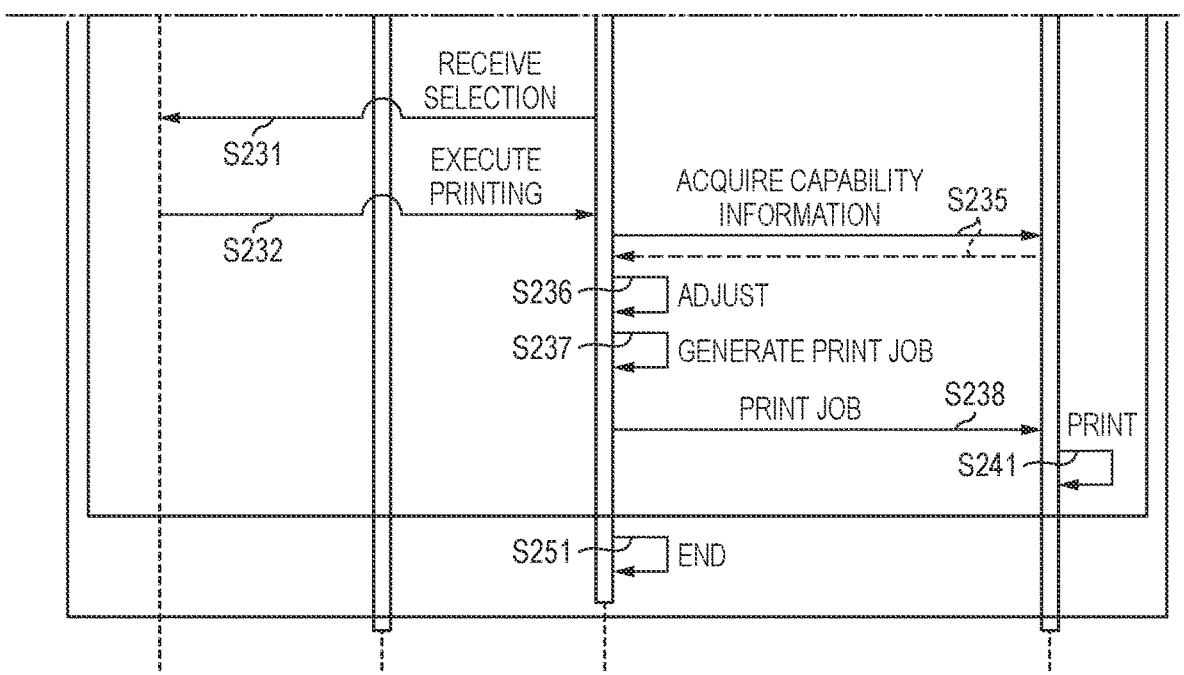

An operation of the print application 22 when being activated by the connection program 211 based on the approach procedure data will be described with reference to the sequence diagram of FIGS. 3A and 3B. A specific example of printing based on the approach procedure data will be described later. Each of the following processes is executed by the CPU 11 of the electronic device 1 based on a program including the print application 22. In FIGS. 3A and 3B, processes by the connection program 211 are also shown as processes by the OS 21.

In the present embodiment, it is assumed that the device 4 is in a state of waiting for the near field communication. When the electronic device 1 is approached to the device 4 within the predetermined distance range by the user (S201), the electronic device 1 automatically establishes the near field communication with the device 4 (S202).

When the establishment of the near field communication by the OS 21 is detected, the connection program 211 determines whether the trigger condition in the procedure data registered in the electronic device 1 is satisfied (S205). Since the approach procedure data is registered in the electronic device 1 in the present embodiment, the connection program 211 of the OS 21 determines that the trigger condition in the approach procedure data is satisfied (alt: [trigger]), and starts the action indicated in the approach procedure data. When the approach procedure data is not registered, the electronic device 1 does not perform the operation shown in FIGS. 3A and 3B.

The connection program 211 acquires the holding information 42 (see FIG. 1) from the device 4 by the near field communication as the action indicated in the approach procedure data (S206). The device 4 transmits the stored holding information 42 in response to a request from the connection program 211.

The connection program 211 executes S206 when the execution of S206 is registered in the action indicated in the approach procedure data. That is, when the execution of S206 is not registered in the action indicated in the approach procedure data, the connection program 211 does not execute S206. The connection program 211 may acquire information corresponding to the printer information 421 or the data information 422 based on, for example, information that acquirable at the time of establishment of the near field communication in S202 or information stored in the memory 12 of the electronic device 1. In the action indicated in the approach procedure data, a process of acquiring information according to a storage location of the information is registered.

The connection program 211 activates the print application 22 (S207), and sends input information including the holding information 42 acquired from the device 4 or the like to the print application 22 (S208). The print application 22 is activated, and the print application 22 acquires the input information from the connection program 211. S208 is an example of an acquisition process. After S208, the connection program 211 ends the action indicated in the approach procedure data.

Since the holding information 42 includes the printer information 421, the print application 22 may acquire the printer information 421 from the input information received at the time of activation. The print application 22 attempts to establish wireless communication with the printer 3 via the first communication IF 14 using the acquired printer information 421 (S211). The wireless communication established in S211 is wireless communication having a larger communication range than the near field communication established in S202.

For example, when the near field communication established in S202 is NFC communication, the wireless communication established in S211 is Wi-Fi, Bluetooth, or BLE communication. In addition, when the near field communication established in S202 is the Bluetooth or BLE communication, the wireless communication established in S211 is the Wi-Fi communication. After establishing the wireless communication in S211, the user can separate the electronic device 1 from the device 4 and confirm, for example, a notification displayed on the user IF 13.

Since the printer 3, which is a partner to establish the wireless communication, is specified by the printer information 421, the time and effort for the user to select the printer 3 can the saved. When the device 4 is included in the printer 3, the printer information 421 is acquired from the printer 3 that is an output destination of a print job, and the configuration in the present embodiment may be further simplified.

The printer information 421 may indicate the near field communication established by the OS 21 in S202. In this case, the print application 22 does not newly establish wireless communication in S211, but communicates with the printer 3 using the established near field communication. On the other hand, when the printer information 421 indicates another connection method other than the near field communication, the print application 22 disconnects the near field communication with the device 4 and attempts to establish new wireless communication with the printer 3 based on the printer information 421.

When the establishment of the wireless communication in S211 is successful, the print application 22 acquires device information from a connection partner (S212). The device information is information indicating a type of the connection partner, and the print application 22 may confirm whether the connection partner is a device having a print function including the printer 3 by using the acquired device information. The print application 22 may acquire the device information by the near field communication.

When the establishment of the wireless communication in S211 fails, or when it is determined that the device information acquired in S212 is not the information indicating the printer, the print application 22 proceeds to S251 and ends the print application 22 itself. For example, when the user starts the action indicated in the approach procedure data by causing the electronic device 1 to approach a device other than the device 4, the electronic device 1 may be connected to a device other than the printer 3. Since the print job is not executable if the connection destination is not a printer, useless communication is avoidable by confirming whether the connection destination is a printer and not outputting the print job when the connection destination is not a printer.

When the wireless communication with the printer 3 is established (alt: [connect to printer]), the print application 22 determines whether further data is necessary in order to determine a print target based on the input information received from the connection program 211.

When the data information 422 (see FIG. 1) indicating the print target is set in the device 4 in advance and the data information 422 is included in the input information, the print application 22 may determine the data to be printed based on the data information 422 included in the input information. When the data to be printed is prepared in the device 4 in advance, the connection program 211 may also acquire the information of the data to be printed from the device 4 by a simple operation of connecting to the device 4. In this case, since the print application 22 may acquire the information of the data to be printed as the input information from the connection program 211, the processes of the print application 22 are further simplified.

The data information 422 may be a text or an image of the print target itself, or may be data indicating an address (URL) at which the data to be printed is stored. When information of the address at which the data to be printed is stored is received, the print application 22 may access the address and read the data to be printed.

On the other hand, when the data information 422 indicating the print target is not included in the input information or when it is determined that additional data is necessary (alt: [data necessary]), the print application 22 acquires the additional data. The data to be printed is specified by the input information received from the connection program 211, that is, the information acquired by the connection program 211 from the device 4 in S206, and the print application 22 may further determine whether the data to be printed is necessary based on the input information.

For example, the print application 22 requests the printer 3 for data and acquires the data from the printer 3 (S213). By acquiring data information from the printer 3 by the wireless communication other than the near field communication, even relatively large data including image data may be acquired.

In addition, the print application 22 may request the OS 21 for data and acquire the data from the OS 21 (S214). When the data is acquired from the OS 21, the data acquired by the print application 22 may be data registered in advance in the OS 21, including information indicating the user of the electronic device 1, or may be data that is acquired by the OS 21 based on a request from the print application 22, including position information of the electronic device 1.

Then, the print application 22 determines the data to be printed by using the data information 422 included in the input information and the additional data acquired from the printer 3 or the OS 21 (S216). The print application 22 may further use the data managed by itself to determine the data to be printed. For example, when the data information 422 includes the information designating a template, the print application 22 may read an image of the designated template and combine the image of the template with characters or the like to be printed to generate the data to be printed.

Figure 4:
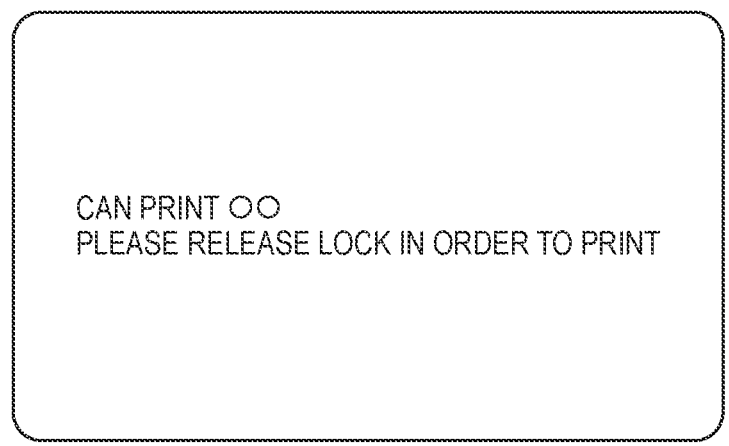
FIG. 4 is an explanatory diagram showing an example of a notification in a locked state.

Next, the print application 22 inquires the OS 21 whether the electronic device 1 is in the locked state, and obtains a response (S221). In the locked state (alt: [locked state]), the print application 22 sends an instruction to display the notification on the user IF 13 to the OS 21 (S222). S222 is an example of a notification process in the locked state. For example, as shown in FIG. 4, the print application 22 causes the user IF to display a message providing a notification that printing by the printer 3 is available and the locked state needs to be released in order to execute the printing.

When any operation on a notification screen being displayed is received, the OS 21 causes the user IF 13 to display a release screen configured to receive input of release information for releasing the locked state, and receives the release information (S223). The user inputs the release information for releasing the locked state on the release screen (S224). The OS 21 determines whether the input release information is appropriate release information, and when it is determined that the input release information is not the appropriate release information, the OS 21 displays the release screen again and maintains the locked state until input of the appropriate release information is received. On the other hand, when it is determined that the appropriate release information is input, the OS 21 releases the locked state to transit into the unlocked state.

In the unlocked state with the user operation, the OS 21 sends information indicating the unlocked state to the print application 22. Accordingly, the print application 22 proceeds to a next operation. After the notification in S222, the print application 22 may end the process when a predetermined time is elapsed without receiving the information indicating the unlocked state.

Figure 5:
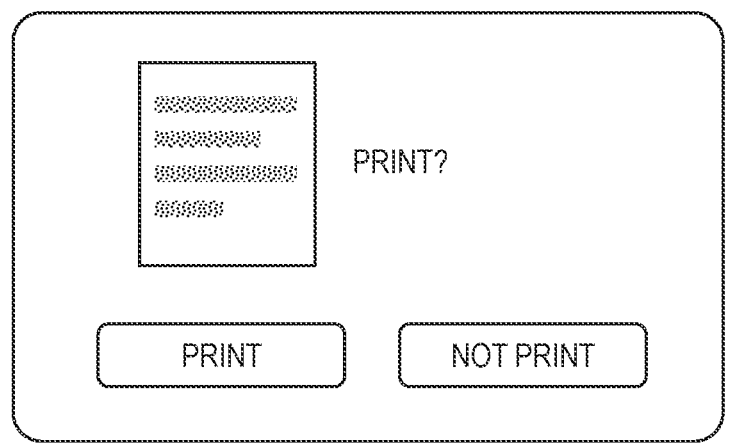
FIG. 5 is an explanatory diagram showing an example of a notification in an unlocked state.

When a response indicating that the electronic device 1 is not in the locked state is obtained in S221, or when the information indicating the unlocked state is received after S222, the print application 22 causes the user IF 13 to display a notification for receiving a selection (S231). A content of the notification in S231 is different from that of the notification in S222. S231 is an example of a notification process in the unlocked state. For example, as shown in FIG. 5, the print application 22 causes the user IF to display a selection screen requesting a user selection and including an image indicating the data to be printed, a button receiving an instruction to print, and a button receiving an instruction not to print. The selection screen may not include the information indicating the data to be printed.

Then, the print application 22 receives the user selection on the selection screen being displayed. A process of receiving the selection on the screen displayed in S231 is an example of a reception process. When a selection not to execute the printing is received, the print application 22 may proceed to S251 and end.

The print application 22 may not receive the user selection of whether to perform printing. For example, when the print application 22 is activated by the connection program 211, the print application 22 may automatically generate a print job and output the print job to the printer 3 regardless of whether the electronic device 1 is in the locked state or in response to the release of the lock. On the other hand, by receiving the user selection, undesired printing may be avoided.

In addition, the determination of whether the electronic device 1 is in the locked state may not be performed. The print application 22 may be able to receive a print instruction even in the locked state. On the other hand, in the locked state, a display content is limited as compared with that in the unlocked state, and thus when notifications that have different contents are issued between the locked state and the unlocked state, notifications suitable for the respective states may be issued.

When a selection of the user to execute the printing is received (S232), the print application 22 requests the printer 3 for the capability information, and acquires, from the printer 3, the capability information which is information indicating a capability related to the printing (S235). The capability information includes, for example, information of the label width of the label sheet accommodated in the printer 3. The print application 22 adjusts the data to be printed determined in S216 based on the acquired capability information (S236).

In S236, the print application 22 adjusts the data to be printed such that the data is appropriate for the capability of the printer 3. For example, when the information of the label width is included in the capability information, the print application 22 adjusts the data to be printed such that a size of the data to be printed in a width direction matches the label width. In addition, for example, when information indicating that printing in a single color is available alone is acquired as the capability information, and the data to be printed is a multicolor image including color information, the print application 22 deletes the color information from the data to be printed in order to generate grayscale image data. By outputting a print job adjusted according to the capability of the printer 3, a possibility of an inappropriate printed matter can be reduced.

A timing of acquiring the capability information is not limited to a timing after the instruction to execute printing is received, and may be any timing after the wireless communication with the printer 3 is established. The capability information may be included in the device information acquired in S212, for example.

The print application 22 generates a print job based on the adjusted data to be printed (S237), and outputs the generated print job to the printer 3 (S238). S238 is an example of an automatic output process. The printer 3 executes the printing by the print unit 31 (see FIG. 1) based on the received print job (S241). Accordingly, a printed matter is generated. After transmitting the print job, the print application 22 ends itself (S251). The print application 22 may disconnect the connection with the printer 3 before the end.

Figure 6:
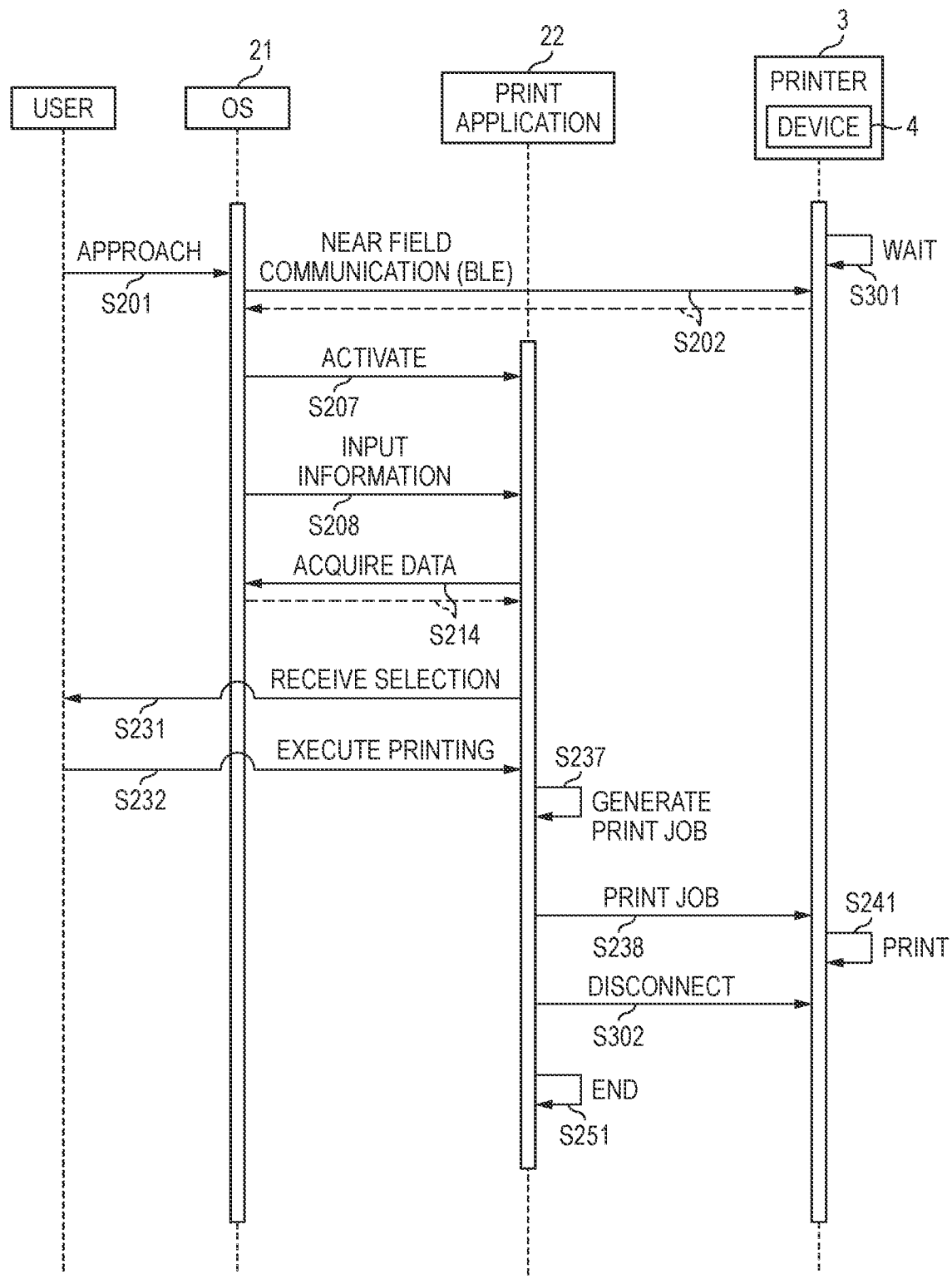
FIG. 6 is a sequence diagram showing procedures of processes executed by a print application for creating a name tag.

Next, a specific application example of printing using the approach procedure data will be described. Hereinafter, an example of creating, using the approach procedure data, a name tag in which a name of the user of the electronic device 1 is described will be described with reference to a sequence diagram of FIG. 6 and explanatory diagrams of FIGS. 7A, 7B, and 7C. Hereinafter, procedures corresponding to the procedures shown in FIGS. 3A and 3B are denoted by the same reference numerals, and description thereof will be simplified.

In this application example, the printer 3 is, for example, a dedicated printer arranged to a reception of an event or a conference. An organizer of the event or the conference prepares a registration file for registering the approach procedure data in advance and distributes the registration file to a person wishing to attend. The person wishing to attend installs the approach procedure data in the electronic device 1 including a smartphone of the person by using the distributed registration file, and brings the electronic device 1 in which the approach procedure data is installed. That is, at start of procedures shown in FIG. 6, it is assumed that the approach procedure data and the print application 22 are registered in the electronic device 1. In this example, the print application 22 may be a dedicated application for creating a name tag by the approach procedure data. In addition, it is assumed that information of the name of the user of the electronic device 1 is registered in the electronic device 1 in advance.

Figure 7A:
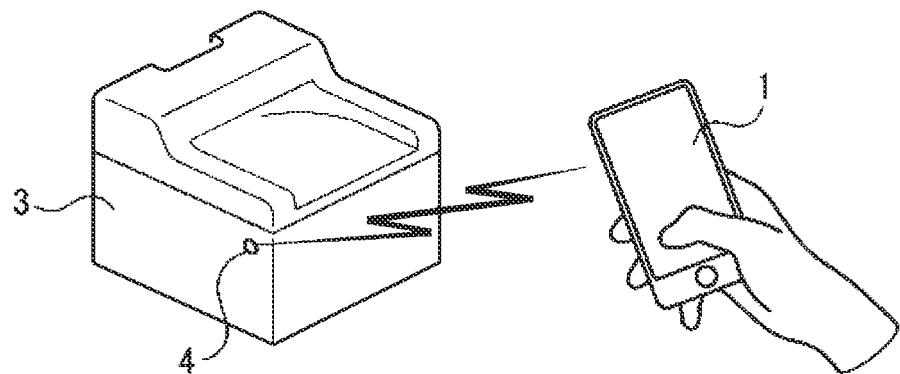
FIGS. 7A, 7B, and 7C are explanatory diagrams showing an example of a name tag creation procedure.

It is assumed that the printer 3 is, for example, a printer having at least a BLE function. The device 4 is a part of the printer 3, and the printer 3 is in a state of waiting for near field communication with BLE (S301), As shown in FIG. 7A, when an attendee of the event or the conference holds the electronic device 1 and approaches the reception, the near field communication with BLE between the electronic device 1 and the printer 3 is established (S202).

Since the approach procedure data is registered in the electronic device 1, the connection program 211 activates the print application 22 (S207), and sends input information including information indicating that the near field communication with the printer 3 is established to the print application 22 (S208). The BLE communication enables transmission of data having a large size to some extent, and handover is not necessary. When the established near field communication is the NFC communication, the print application 22 may perform the handover to the Wi-Fi, Bluetooth, or BLE communication, or the like based on the holding information 42 of the printer 3.

The print application 22 acquires the information of the name of the user, which is data to be printed, from the OS 21 (S214). The data to be printed may not be the information of the name of the user of the electronic device 1. For example, the data to be printed may be information registered in advance in the approach procedure data, or may be information included in an electronic mail or the like received by the electronic device 1. Then, the print application 22 arranges the acquired information in a predetermined template, and generates data to be printed.

Figure 7B:
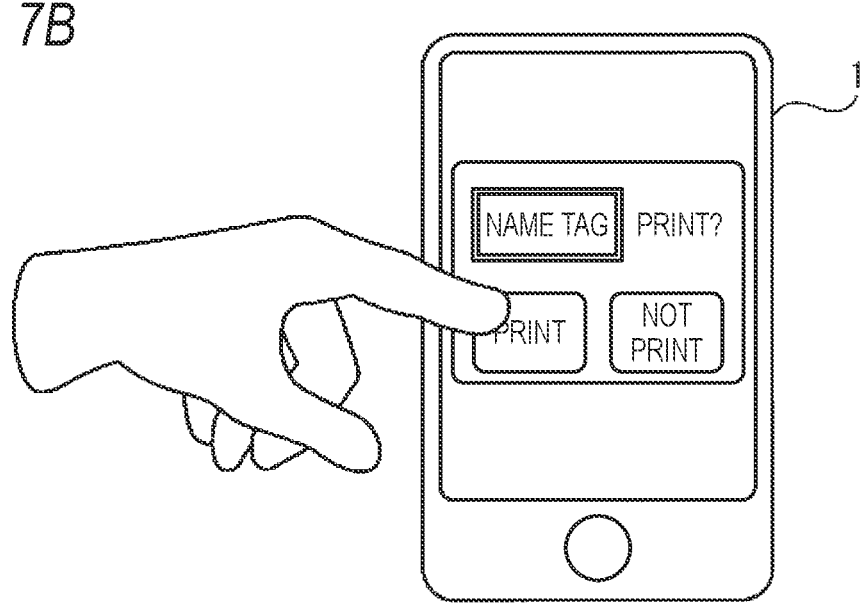

As shown in FIG. 7B, the print application 22 causes the user IF 13 to display a notification for receiving a selection of printing (S231), and receives a user operation (S232). As long as the user bringing the electronic device 1 goes to the reception, the print application 22 is activated based on the approach procedure data, and receives a print instruction of the name tag. The print application 22 may receive an instruction to correct or add data to be printed.

Figure 7C:
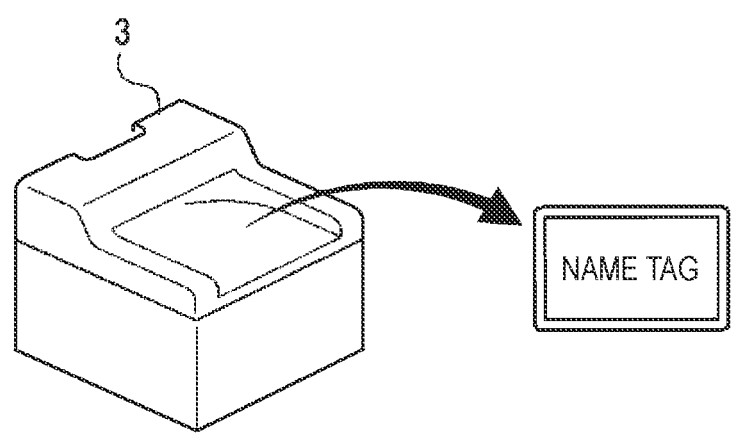

When an instruction to execute printing of the user is received, the print application 22 generates a print job (S237), and outputs the generated print job to the printer 3 (S238). The printer 3 in which the print job is received executes the printing as shown in FIG. 7C (S241). Accordingly, a name tag that is a printed matter is created.

After outputting the print job, the print application 22 disconnects the connection with the printer 3 (S302), and ends itself (S251). Instead of disconnecting the connection, the print application 22 may cause the user IF 13 to display a message instructing to separate the electronic device 1 from the printer 3. After the communication with the electronic device 1 is disconnected, the printer 3 is brought into a waiting state again at a predetermined timing.

As described above in detail, when the print application 22 described in the present description is activated by the connection program 211 based on the approach procedure data, the print application 22 receives the input information from the connection program 211, establishes the wireless communication with the printer 3 using the printer information 421 included in the received input information, and automatically outputs the print job to the printer 3. Therefore, the time and effort of the user at the time of printing is reduced as compared to a case where an operation for connection with the printer 3 or an operation for a print instruction is performed after the print application 22 is activated.

The present embodiment is merely an example, and does not limit the present disclosure in any way. Therefore, as a matter of course, the present disclosure can be improved and modified in various ways within a range not departing from the gist thereof. For example, the printer 3 connected to the electronic device 1 is not limited to a device having a single printing function, and may be any device having a communication function and a printing function, including a multi function device, a copying machine, or a fax machine.

In the present embodiment, the procedures based on the approach procedure data have been described alone, but other procedure data may be further registered in the electronic device 1. When the procedure data in which the activation procedure of the print application 22 is included in the actions is further registered, the print application 22 may execute a process different from that in the present embodiment according to the input information based on the procedure data.

In the present embodiment, the printer information 421 indicating the printer 3 is acquired by the OS 21 through the near field communication with the device 4, and is acquired by the print application 22 via the OS 21, but the present disclosure is not limited thereto. For example, the printer information 421 may be registered in advance in the approach procedure data.

In the present embodiment, the data information 422 indicating the data to be printed is acquired by the OS 21 through the near field communication with the device 4, and is acquired by the print application 22 via the OS 21, but the present disclosure is not limited thereto. For example, the data information 422 may be registered in advance in the approach procedure data or the print application 22, or may be acquired by the print application 22 from the device 4 or the printer 3 after activation.

For example, the information of the template is included in the data information 422 of the printer 3, but the present disclosure is not limited thereto. The information of the template may be registered in advance in the print application 22, for example, or may be selected by the user. In addition, the template may not be used. In the present embodiment, it is assumed that the capability information is acquired from the printer 3 to adjust the data to be printed, but the adjustment may not be performed. In the present embodiment, it is assumed that when the near field communication is BLE, the handover is not necessary, but the handover may be performed.

In the present embodiment, it is assumed that when the print application 22 is activated based on the procedure data, the print application 22 ends itself when the process is ended, but the print application 22 may not be ended.

In any flowchart disclosed in the embodiment, a plurality of processes in any plurality of steps can be freely changed in an execution order or executed in parallel as long as no contradiction occurs in process contents.

The processes disclosed in the embodiment may be executed by hardware including a single CPU, a plurality of CPUs, or an ASIC, or a combination thereof. In addition, the processes disclosed in the embodiment can be implemented in various aspects including a recording medium in which a program for executing the processes is recorded, a method, or the like.

What is claimed is:

1. A non-transitory computer readable medium storing an application program causing an information processing apparatus to execute a process for printing, an operating system of the information processing apparatus having an automatic function which automatically executes a series of procedures for a plurality of functions and operations in response to satisfaction of an activation condition in a case where procedure data indicating the series of procedures and the activation condition is registered in the operating system, the application program being configured to be activated based on a user operation using a user interface of the information processing apparatus, or activated by the automatic function of the operating system, the information processing apparatus including a first communication interface configured to perform a first wireless communication conforming to a given standard, the process comprising:

receiving a selection of data to be printed using the user interface and outputting a print job based on the selected data to be printed in a case where the application program is activated based on the user operation using the user interface of the information processing apparatus;

acquiring input information in a case where the application program is activated by the automatic function of the operating system, the input information being sent from the operating system at the time of the activation of the application program and including connection information used for establishing the first wireless communication, the operating system sending the input information including the connection information to the application program at the time that the application program is activated by the automatic function; and establishing the first wireless communication with a specific printer using the connection information included in the input information acquired in the acquiring, and outputting the print job to the specific printer using the first wireless communication in the case where the application program is activated by the automatic function of the operating system.

2. The non-transitory computer readable medium according to claim 1, wherein the information processing apparatus includes a second communication interface configured to perform a second wireless communication having a smaller communication range than that of the first wireless communication, in the acquisition process, the information processing apparatus receives the connection information from a specific device by establishing the second wireless communication with the specific device, specific procedure data in which establishment of the second wireless communication is set as the activation condition is registered in the operating system, and the operating system passes the connection information received from the specific device to the application program in a case where the application program is activated by the automatic function based on the specific procedure data in response to the establishment of the second wireless communication.

3. The non-transitory computer readable medium according to claim 2, wherein the specific printer is integrated with the specific device,
the information processing apparatus receives the connection information from the specific printer after establishing the second wireless communication with the specific printer, the operating system passes the input information including the connection information received from the specific printer to the application program in a case where the application program is activated by the automatic function based on the specific procedure data in response to the establishment of the second wireless communication, and in the acquisition process, the input information including the connection information received from the specific printer is acquired by being passed from the operating system.

4. The non-transitory computer readable medium according to claim 2, wherein the second wireless communication conforms to a near field communication (NFC) standard.

5. The non-transitory computer readable medium according to claim 2, wherein the second wireless communication conforms to a bluetooth low energy (BLE) standard.

6. The non-transitory computer readable medium according to claim 2, wherein in the acquiring, the input information including the connection information and data information indicating the data to be printed is acquired, the information processing apparatus receives the connection information and the data information from the specific device after establishing the second wireless communication with the specific device, and the operating system passes the connection information and the data information received from the specific device to the application program when the application program is activated by the automatic function based on the specific procedure data in response to the establishment of the second wireless communication, and in the establishing and outputting, the first wireless communication is established with the printer by using the connection information included in the input information acquired in the acquiring, and the print job that prints the data to be printed indicated by the data information included in the input information acquired in the acquiring is output to the printer by the first wireless communication.

7. The non-transitory computer readable medium according to claim 1, wherein in the establishing and outputting, after the first wireless communication is established using the connection information included in the input information acquired in the acquiring, device information is acquired from a connection destination, and in a case where the acquired device information indicates a printer, the print job is output to the specific printer by the first wireless communication, and in a case where the acquired device information does not indicate a printer, the print job is not output.

8. The non-transitory computer readable medium according to claim 1, wherein the process further comprises issuing a notification based on the input information by using the user interface of the information processing apparatus in a case where the application program is activated by the automatic function of the operating system, a display mode of the user interface of the information processing apparatus including a locked state in which a part of input by the user interface is restricted and an unlocked state which is not the locked state, and a notification content in the notification process in the locked state being different from that in the unlocked state.

9. The non-transitory computer readable medium according to claim 8, wherein the issuing is performed after the acquiring and before the establishing and outputting in a case where the application program is activated by the automatic function of the operating system, in the issuing, a notification requesting a selection of whether to perform printing based on the input information is issued as the notification, and the process further comprises, after the issuing, receiving the selection of whether to perform the printing based on the input information, and the establishing and outputting is performed after receiving the selection of performing the printing based on the input information.

10. A non-transitory computer readable medium storing an application program causing an information processing apparatus to execute a process for printing, an operating system of the information processing apparatus having an automatic function which automatically executes a series of procedures for a plurality of functions and operations in response to satisfaction of an activation condition in a case where procedure data indicating the series of procedures and the activation condition is registered in the operating system, the information processing apparatus including a first communication interface configured to perform a first wireless communication conforming to a given standard, and the application program being configured to be activated based on a user operation using a user interface of the information processing apparatus, or activated by the automatic function of the operating system, the process comprising:

receiving a selection of data to be printed using the user interface and outputting a print job based on the selected data to be printed in a case where the application program is activated based on the user operation using the user interface of the information processing apparatus; and establishing the first wireless communication with a printer provided with a communication interface configured to perform the first wireless communication, determining data to be printed, and outputting a print job that prints the data to be printed determined in the determining to the printer with which the first wireless communication is established in the establishing, in a case where the application program is activated by the automatic function of the operating system.

11. The non-transitory computer readable medium according to claim 10, wherein the determining is performed after establishing the first wireless communication with the printer in the establishing in a case where the application program is activated by the automatic function of the operating system, and in the determining, data information is acquired from the printer by the first wireless communication, and the data to be printed is determined based on the acquired data information.

12. The non-transitory computer readable medium according to claim 10, wherein the process further comprises acquiring input information input from the operating system at the time of activation in a case where the application program is activated by the automatic function of the operating system, the operating system specifying data information after the activation condition included in the registered procedure data is satisfied, and the operating system passing the input information including the specified data information to the application program when the application program is activated by the automatic function in response to satisfaction of the activation condition included in the registered procedure data, and in the determining, the data to be printed is determined based on the data information included in the input information acquired in the acquiring.

13. The non-transitory computer readable medium according to claim 12, wherein the information processing apparatus includes a second communication interface configured to perform a second wireless communication having a narrower communication range than that of the first wireless communication, in the acquiring, the input information including data information stored in a specific device configured to perform the second wireless communication is acquired, the information processing apparatus further receives the data information from the specific device after establishing the second wireless communication with the specific device, specific procedure data in which establishment of the second wireless communication is set as the activation condition is registered in the operating system, and the operating system sends the input information including the data information received from the specific device to the application program when the application program is activated by the automatic function based on the specific procedure data in response to the establishment of the second wireless communication.

14. The non-transitory computer readable medium according to claim 13, wherein the second wireless communication conforms to a near field communication (NFC) standard.

15. The non-transitory computer readable medium according to claim 13, wherein the second wireless communication conforms to a bluetooth low energy (BLE) standard.

16. The non-transitory computer readable medium according to claim 13, wherein in the acquiring, the input information including printer information specifying the printer to be a connection destination is acquired, the information processing apparatus receives the data information and the printer information from the specific device by establishing the second wireless communication with the specific device configured to perform the second wireless communication, and the operating system passes the input information including the data information and the printer information received from the specific device to the application program when the application program is activated by the automatic function based on the specific procedure data in response to the establishment of the second wireless communication, and in the establishing, the first wireless communication is established with the printer specified by the printer information included in the input information acquired in the acquiring.

17. The non-transitory computer readable medium according to claim 16, wherein the specific device is a printer configured to perform the first wireless communication, and in the outputting, the print job that prints the data to be printed determined in the determining is output to the printer that is the specific device in which the first wireless communication is established with the information processing apparatus in the establishing.

18. The non-transitory computer readable medium according to claim 10, wherein the process further comprises further acquiring capability information from the printer with which the first wireless communication is established in the establishing in a case where the application program is activated by the automatic function of the operating system, and in the outputting, the data to be printed determined in the determination process is adjusted based on the capability information acquired in the further acquiring, and the print job that prints the adjusted data is output to the printer with which the first wireless communication is established in the establishing.

19. The non-transitory computer readable medium according to claim 10, wherein
the process further comprises issuing a notification related to printing by using the user interface of the information processing apparatus when the application program is activated by the automatic function of the operating system, and
a display mode of the user interface of the information processing apparatus includes a locked state in which a part of input by the user interface is restricted and an unlocked state which is not the locked state, and a notification content in the notification process in the locked state being different from that in the unlocked state.

20. The non-transitory computer readable medium according to claim 19, wherein
the issuing is performed after the determining and before the outputting in a case where the application program is activated by the automatic function of the operating system,
in the issuing, a notification requesting a selection of whether to perform printing based on the data to be printed determined by the determination process is issued as the notification,
the process further comprises, after the issuing, receiving the selection of whether to perform the printing based on the data to be printed determined by the determination process, and
the outputting is performed after receiving the selection of performing the printing.

\* \* \* \* \*